UNITED STATES PATENT OFFICE.

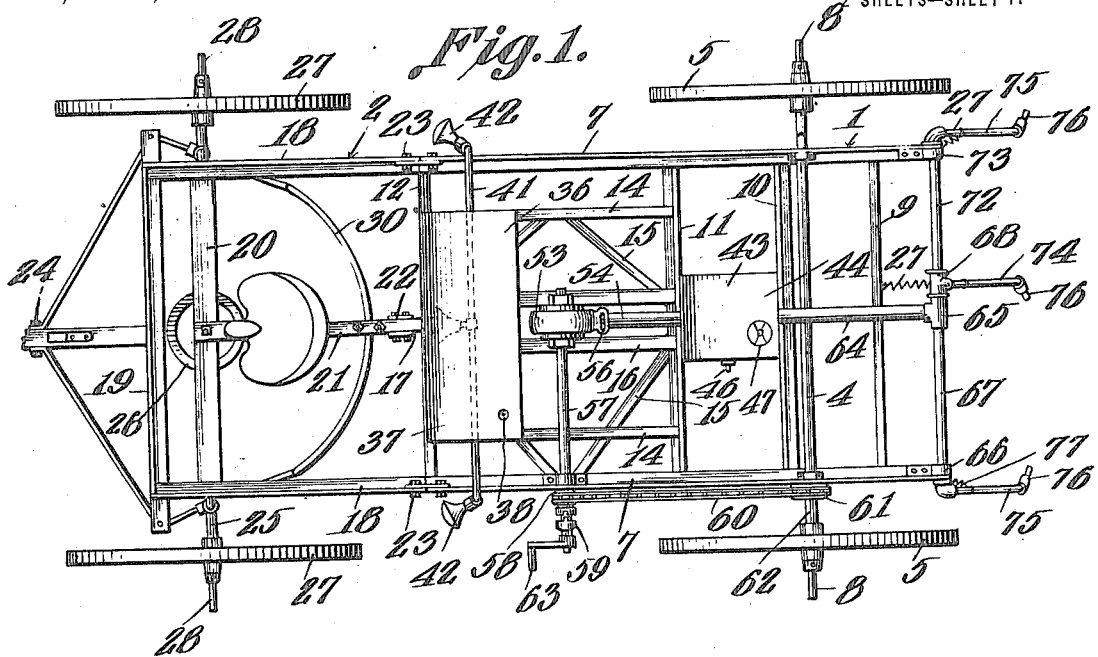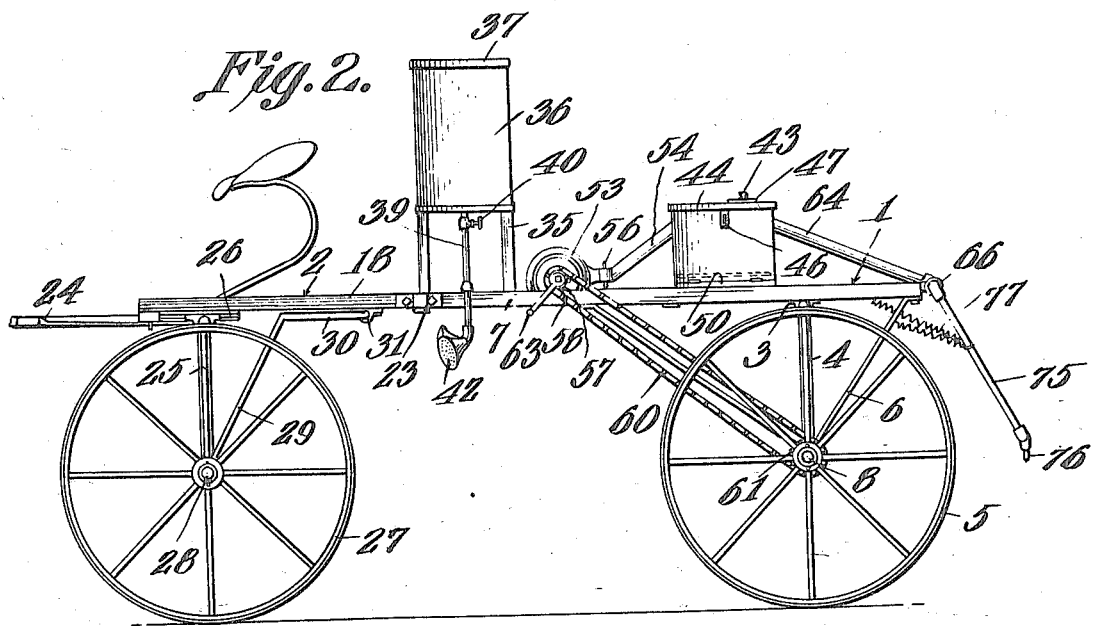

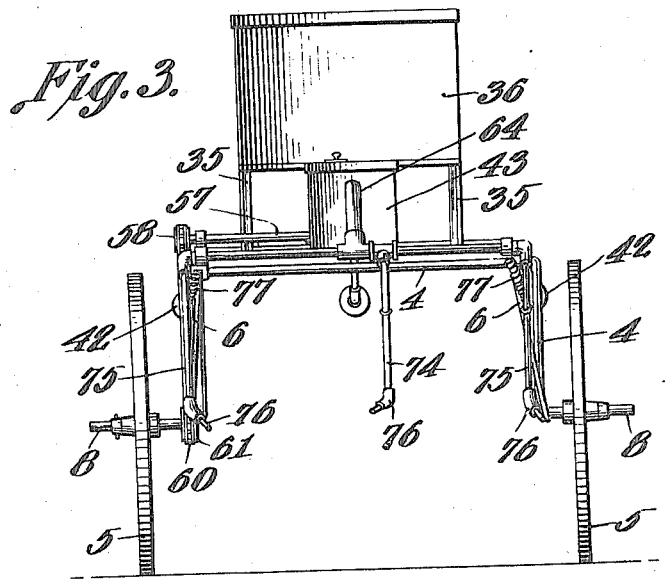
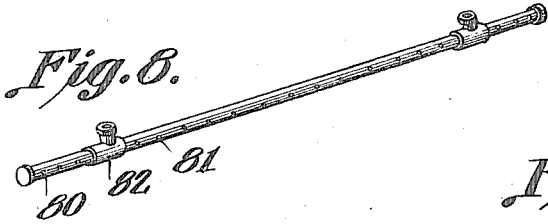
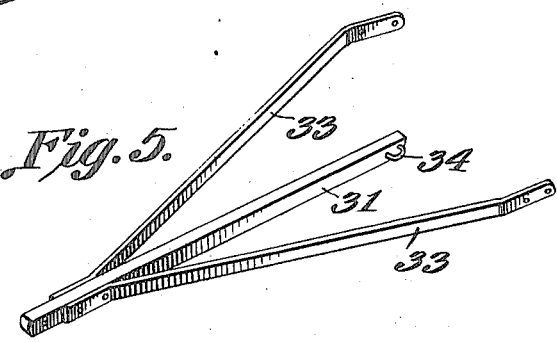
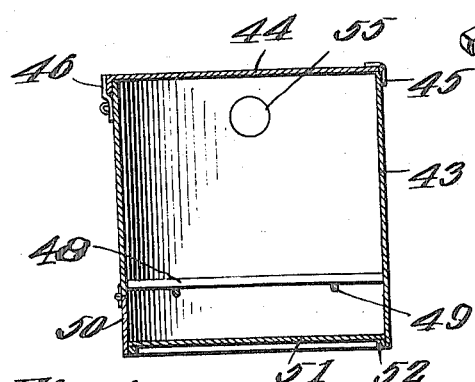
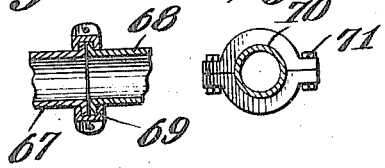

THEOPHILUS M. RAWLS AND ROBERT A. MILLER, OF DUBLIN, TEXAS.

INSECT-EXTERMINATOR.

1,184,997.

Specification of Letters Patent. Patented May 30, 1916.

Application filed July 21, 1914. Serial No. 852,330.

*To all whom it may concern:*

Be it known that we, THEOPHILUS M. RAWLS and ROBERT A. MILLER, citizens of the United States, residing at Dublin, in the county of Erath, State of Texas, have invented a new and useful Insect-Exterminator, of which the following is a specification.

The device forming the subject matter of this application is adapted to be employed for exterminating boll weevils and other insects which infest cotton, grain or other standing crops.

One object of the present invention is to provide novel means for producing a fumigating gas or compound and for distributing the same upon the crop.

Another object of the invention is to provide novel means whereby the crop may be sprayed, either with an insecticide compound, or with water to avoid an injury to the crop, if dry, by the action of the fumigating insecticide which is applied thereto.

Another object of the invention is to provide a novel driving mechanism operatively connected with the blower and one of the ground wheels of the vehicle, the construction being such that the blower may either be operated by hand or from the vehicle wheel.

Another object of the invention is to provide a device of this character having a plurality of discharge arms or nozzles adapted for vertical movement to clear stumps and like obstructions as the vehicle moves forwardly, resilient means being provided for restoring the discharge arms or nozzles to operative positions after the obstacle has been passed.

Another object of the invention is to improve the vehicle construction.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings: Figure 1 shows in top plan, a fumigator and insect destroying device constructed in accordance with the present invention; Fig. 2 is a side elevation of the structure depicted in Fig. 1; Fig. 3 is a rear elevation of the structure delineated in Fig. 1; Fig. 4 is a cross section of the furnace; Fig. 5 is a perspective view depicting an auxiliary coupling employed in connection with a vehicle structure; Fig. 6 is a longitudinal section showing a means whereby certain of the distributing elements of the device are operatively connected for individual swinging movement; Fig. 7 is a cross section of the structure shown in Fig. 6; Fig. 8 is a perspective view showing a modified form of discharge member.

In carrying out the invention there is provided a vehicle, the same preferably embodying a main frame 1 and a supplemental frame 2. Secured as indicated at 3 to the side bars 7 of the main frame 1 is an upwardly arched rear axle 4 adapted to straddle the rows of standing cotton, corn or the like. Journaled on the ends of the upwardly arched rear axle 4 are ground wheels 5, the axle 4 being reinforced and sustained by frame connected braces 6. As indicated at 8, the extremities of the axle 4 are prolonged sufficiently so that the wheels 5 may be adjusted toward and away from each other, to the end that the wheels may travel properly with respect to the standing crop. The side bars 7 of the main frame 1 are connected by cross bars 9, 10, 11 and 12. Longitudinal bars 14 connect the cross bars 11 and 12 and diagonal braces 15 connect the longitudinal bars 14 with the cross bars 11 and 12. Located between the longitudinal bars 14 and secured to the cross bars 11 and 12 are parallel bars 16. Connected with the cross bar 12 is a forwardly extended reach 17.

The supplemental frame 2 of the vehicle embodies side bars 18, an end bar 19 and a cross bar 20. Extended rearwardly from the cross bar 20 of the supplemental frame is a reach 21 detachably coupled as indicated at 22 with the reach portion 17 of the main frame 1. The longitudinal bars 18 of the supplemental frame 2 are detachably coupled as indicated at 23 to the longitudinal bars 7 of the main frame 1. The supplemental frame 2 is provided with any suitable draft rigging indicated at 24. The front axle 25 is of the arched construction hereinbefore described and is connected to the cross bar 20 by means of a fifth wheel 26. Journaled on the ends of the front axle 25 are ground wheels 27, and, as indicated at 28, provision is made whereby the wheels 27 may be adjusted toward and away from each other for the purpose hereinbefore specified. Projecting from the front axle 27 are rearwardly and upwardly inclined braces 29, merging into a horizontal segment 30 slidably retained in a guide 31 secured to the under side of the reach 21.

From the foregoing it will be seen that the invention includes a four wheeled vehicle upon which the fumigating and insecticide mechanisms to be described hereinafter are mounted. If desired, the supplemental frame 2 may be detached from the main frame 1 as will be obvious and under such circumstances, there is called into requisition, a coupling shown in detail in Fig. 5, the coupling embodying a central bar 31 and diverging side arms 33 connected therewith. The side arms 33 may be united with the side bars 7 of the main frame 1 and the rear end of the bar 31 may be united by means of a U-bolt 34 or otherwise, with the rear portion 17 of the main frame 1. The forward end of the bar 31 may be connected with a cultivator axle (not shown) or with any other accessible part of a vehicle, so that the main frame 1 and the mechanism carried thereby may be drawn over the field.

Fixed to and upstanding from the longitudinal bars 14 and the cross bar 12 are legs 35 supporting a tank 36 of any desired form and of any desired capacity, the tank 36 being provided, if deemed expedient, with a movable lid 37 which may have an air inlet 38. Projecting downwardly from the tank 36 is a pipe 39 carrying a cut off valve 40, the pipe 39 communicating with the intermediate portion of a cross pipe 41 provided at its ends and near its center with projecting spray heads 42, the construction being such that three rows may be treated at once by the spray heads 42. Obviously, the pipe 41 may be of any desired length and more than three spray heads 42 may be used, this change being well within the scope of the skill of a mechanic.

The tank 36 may contain a liquid insecticide of any standard or well known sort, or it may contain water, to be distributed by the spray heads 42 upon the standing crops, in advance of a mechanism to be described hereinafter for discharging upon the crop, heated gases proceeding from a furnace. If the crop is dry, obviously, the water discharged through the spray heads 42 tends to prevent a damage to the crop by the application thereto of the gaseous products emanating from the furnace above mentioned.

The furnace may be of any desired form but, as shown in Fig. 4, the same includes a casing 43 supported upon the cross bars 10 and 11, the casing 43 being equipped with a lid 44 hingedly mounted as shown at 45 and coöperating with a latch 46. In some portion of the furnace, preferably in the lid 44 there is an opening which is controlled by a damper 47. Located in the furnace casing 43 is a grate 48 upheld on supports 49 projecting from the walls of the casing. At one side, the casing 43 of the furnace is equipped with a hinged door 50, permitting the removal of the ashes, and coöperating with the damper 47 to regulate the draft through the furnace. Mounted in the furnace casing 43 is a slidable ash tray 51 upheld by guides 52.

Mounted upon the parallel bars 16 of the vehicle frame or otherwise supported is a blower 53. Communicating with the casing of the blower 53 is a pipe 54 which enters the casing 43 of the furnace above the grate 48, as indicated at 55 in Fig. 4. The pipe 54 carries a damper 56 whereby the blast proceeding from the blower 53 may be regulated. The blower 53 includes a shaft 57 disposed transversely of the vehicle frame. Journaled for rotation on the shaft 57 adjacent its outer end is a loose sprocket wheel 58. This sprocket wheel 58 may be coupled up operatively with the shaft 57 through the medium of a clutch 59. Extended around the sprocket wheel 58 is a sprocket chain 60, passed about a sprocket wheel 61 attached to the extended portion 62 of the hub of one of the rear ground wheels 5.

Projecting from the rear wall of the furnace casing 43 is a discharge pipe 64, the inner end of which is in alinement both vertically and horizontally with the inner end of the pipe 54. Mounted on the rear end of the pipe 64 is a socket 65. Upon one of the side bars 7 is located a bearing 66. In the bearing 66 and in the socket 65 is held a pipe 67. Rotatable upon the inner end of the pipe 67 is a coupling 68. Any suitable means may be provided for uniting the coupling 68 with the pipe 67. If desired, the pipe 67 and the coupling 68 may be provided with annular flanges 69, engaged by a two part clamp 70, the constituent elements of which are held together by securing devices 71. A pipe 72 is held in a bearing 73 on the other side bar 7 and the inner end of the pipe 72 is connected with the coupling 68 in the manner hereinbefore described. The coupling 68 carries a rearwardly extended downwardly prolonged tubular discharge arm 74 and other tubular discharge arms 75 are journaled on the ends of the pipes 67 and 72 respectively, for vertical swinging movement. Rotatably mounted upon the ends of the arms 74 and 75 are laterally extended nozzles 76, the nozzles 76 being rotatable upon the respective discharge arms to enable the nozzles to discharge in any desired direction. Retractile springs 77 are united with the discharge arms 75 and 74 and are connected with any accessible portions of the vehicle frame such, for instance, as with the braces 6 and the cross bar 9. When the arms 75 swing rearwardly, springs 77 are put under tension, but when the arms 75 swing forwardly to a sufficient extent, the springs cease to exercise a retractile action, and constitute supports for the arms, preventing the arms from swinging forwardly.

In practical operation, a fuel of any desired sort is placed upon the grate 48 in the casing 43. If the vehicle is not in motion, the clutch 59 is manipulated to disconnect the sprocket wheel 58 from the shaft 57. The shaft 57 under such circumstances no longer is connected with the driving ground wheel and then the shaft 57 may be rotated through the instrumentality of a detachable handle 63 which is applied to the outer end of the shaft 57. Thus, the blower 53 may be operated to create the necessary draft in the burner 43, while the vehicle is at rest. When the vehicle is in motion, the clutch 59 having been employed to couple up the sprocket wheel 58 operatively with the shaft 57, motion is imparted to the shaft 57 by means of the sprocket chain 60, the blower being driven. In the furnace 43 is placed a fumigating compound of any desired sort, a mixture of sulfur and potassium nitrate being suitable for this purpose, an acceptable proportion being 95% sulfur and 5% potassium nitrate. Any fuel may be used. By manipulating the damper 47 and the door 50, the amount of air entering the furnace casing 43 may be regulated, and thus any amount of air may be combined with the fumigating compound above mentioned. The mixture thus produced is blown through the pipe 64, by the action of the blower 53 and passes from the pipe 64 into the pipes 72 and 67 and from these pipes, by way of the arms 75 and 74 and the nozzles 76 onto the standing crop.

As has been pointed out hereinbefore, the tank 36 and attendant mechanism may be employed for moistening the standing crop, prior to the application thereto of the gaseous products proceeding from the furnace 43. At times, notably when wheat and like crops are to be treated, there is employed a supplemental discharge head shown in Fig. 8. This head is in the form of a tube 80 having perforations 81. T-couplings 82 are interposed in the pipe 80 and these couplings 82 may be connected with the outermost tubular arms 75, the intermediate arm 74 being removed or plugged. When the vehicle moves forwardly over the ground and when a stump or other obstruction passes between the wheels of the vehicle, such obstruction, engaging one or all of the tubular arms 75—74, will elevate the same, the springs 77 being put under tension. So soon as the obstruction has been passed, the springs 77 will operate to restore the arms 74 and 75 to the normal positions shown in the drawings.

Having thus described the invention, what is claimed is:—

In a device of the class described, a vehicle including a frame; a cross pipe mounted on the frame; downwardly extended tubular arms communicating with the cross pipe and mounted to swing vertically; springs connecting the tubular arms with the frame; and mechanism for discharging an insecticide into the cross pipe, the springs being adapted to yield, as the arms swing rearwardly, and being adapted to act as supports for the arms, when the arms swing forwardly a predetermined amount.

In testimony that we claim the foregoing as our own, we have hereto affixed our signatures in the presence of two witnesses.

THEOPHILUS M. RAWLS.
ROBERT A. MILLER.

Witnesses:
ROBT. PEACOCK,
P. A. BURNETT.